United States Patent [19]

Whyte et al.

[11] 4,065,763

[45] Dec. 27, 1977

[54] DISTRIBUTION NETWORK POWER LINE COMMUNICATION SYSTEM

[75] Inventors: Ian A. Whyte, Churchill; Paul H. Haley, Pittsburgh, both of Pa.

[73] Assignee: Westinghouse Electric Corporation, Pittsburgh, Pa.

[21] Appl. No.: 638,570

[22] Filed: Dec. 8, 1975

[51] Int. Cl.² .............................................. H04B 3/56
[52] U.S. Cl. .............................. 340/310 R; 307/149; 323/128
[58] Field of Search ......... 340/310 A, 310 R, 310 CP; 333/84 L, 33, 17 M; 307/3, 149; 323/128, 110, 105; 178/66 A

[56] References Cited

U.S. PATENT DOCUMENTS

| | | | |
|---|---|---|---|
| 2,294,735 | 9/1942 | Du Mont | 340/310 R |
| 2,347,512 | 4/1944 | Schroeder | 323/128 |
| 2,713,145 | 7/1955 | Storsand | 323/128 |
| 2,743,434 | 4/1956 | Fleming | 340/310 R |
| 3,942,170 | 3/1976 | Whyte | 340/310 A |
| 3,967,264 | 6/1976 | Whyte et al. | 340/310 A |

*Primary Examiner*—John W. Caldwell, Sr.
*Assistant Examiner*—James J. Groody
*Attorney, Agent, or Firm*—D. R. Lackey

[57] ABSTRACT

A distribution network power line communication system which includes coupling means for applying a carrier current communication signal to the polyphase primary distribution conductors with a proportional relationship between the signal voltages applied to the various conductors selected to provide a predetermined propagation mode. Impedance elements are connected between the conductors at selected points remote from the coupling point, such as at the location of unbalanced loads, line taps, branches, capacitor banks, distribution transformers, and other line discontinuities which may cause mode conversion. The impedance elements are selected and connected to re-establish the predetermined propagation mode.

18 Claims, 5 Drawing Figures

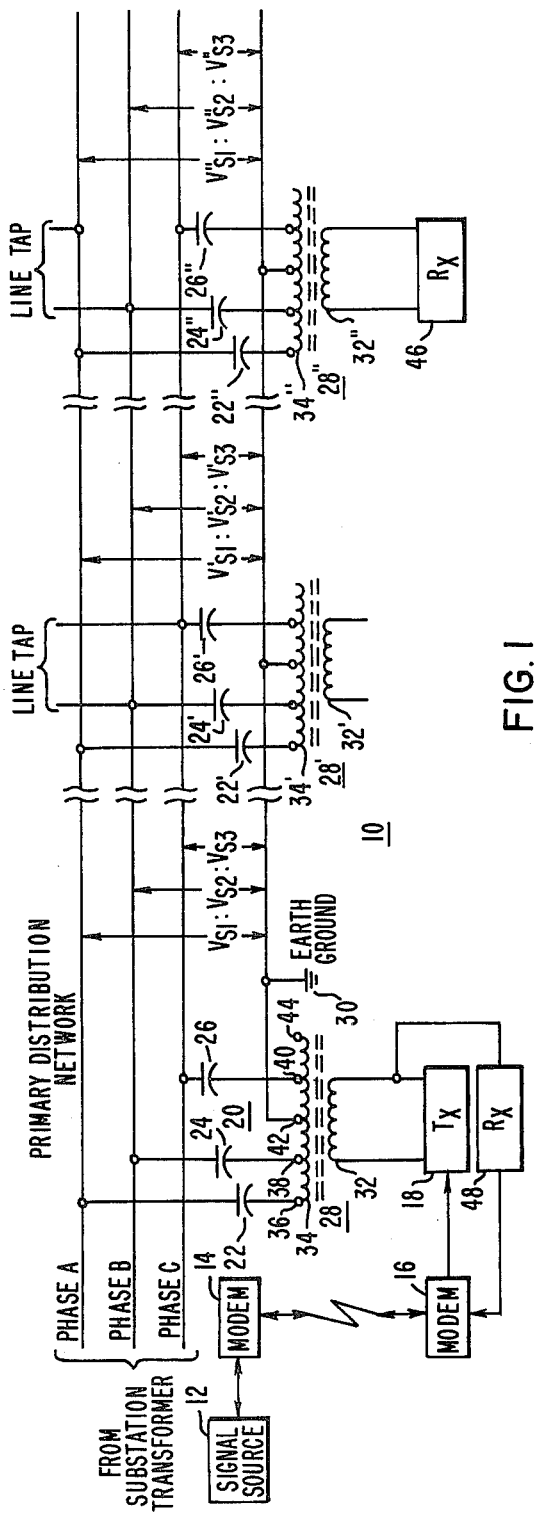
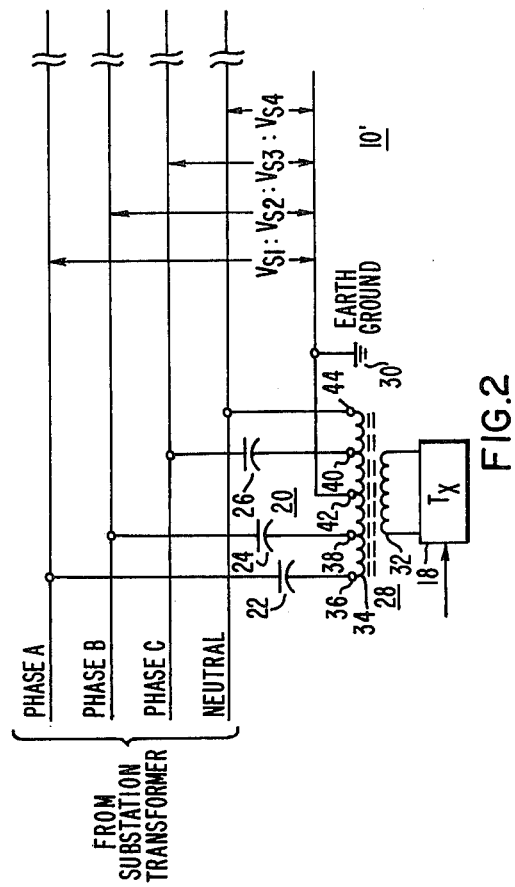
FIG. 1
FIG. 2

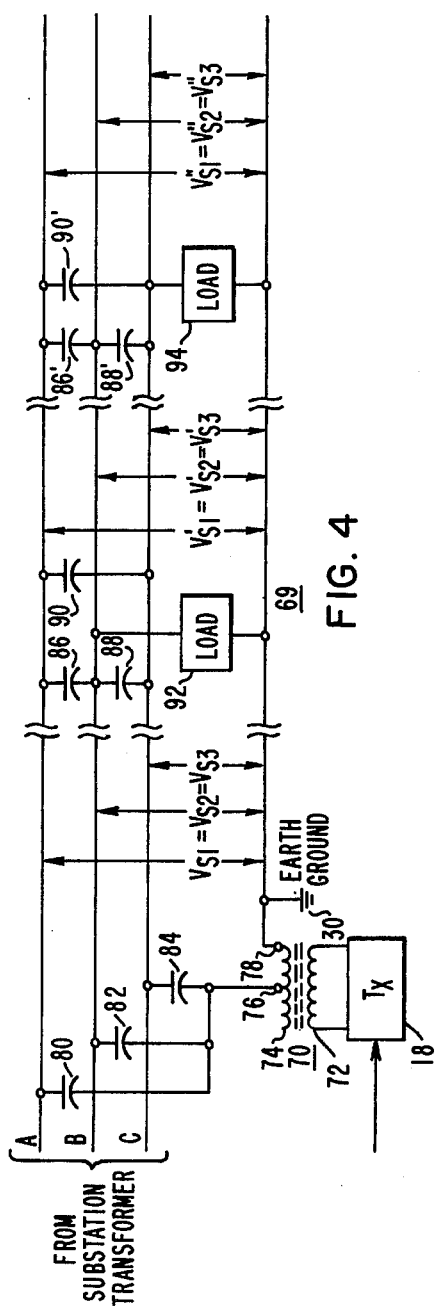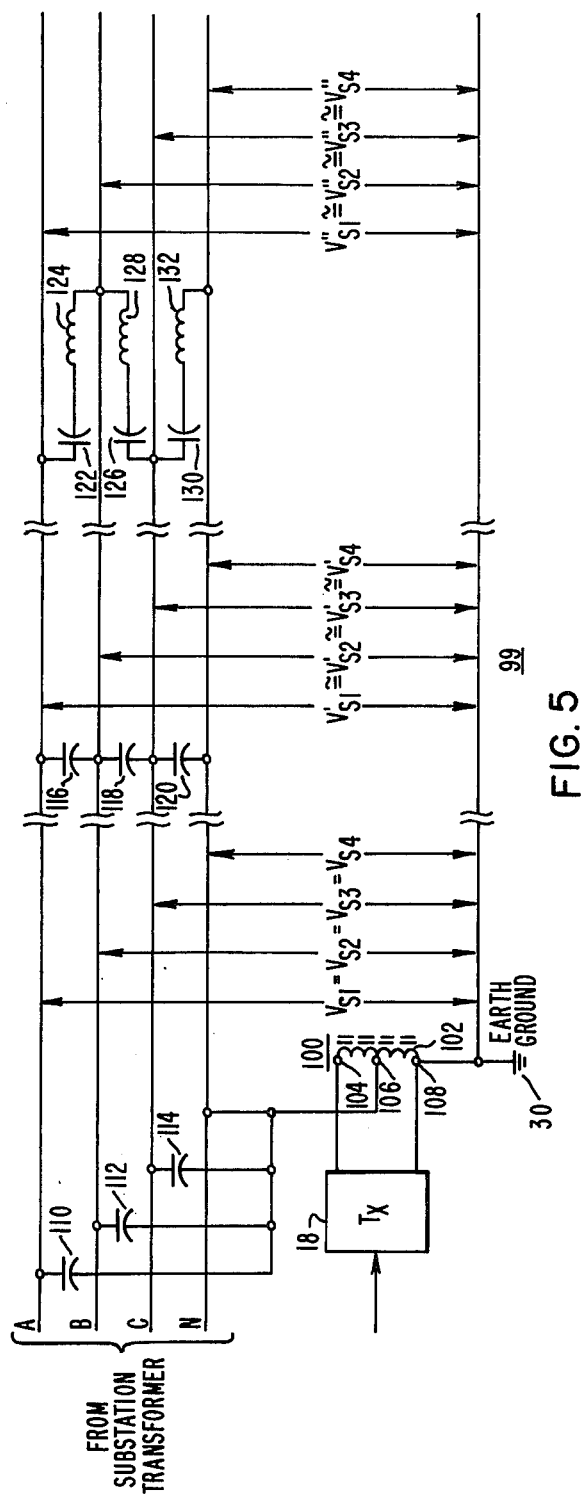

DISTRIBUTION NETWORK POWER LINE COMMUNICATION SYSTEM

BACKGROUND OF THE INVENTION

1. Field of the Invention

The invention relates in general to power line carrier communication systems, and more specifically to power line carrier communication systems which utilize the distribution network for communication.

2. Description of the Prior Art

Power line carrier communication has been used for many years over the high voltage transmission lines which extend from the power generating site to the distribution substations, for supervisory control purposes. The transmission line is a homogeneous medium for communication signals as it extends for miles without interruptions of the type which would disturb the communication signal.

In recent years the electric utilities have expressed an interest in power line carrier for automating the distribution of electricity, i.e, such tasks as performing load continuity checks, switching, selective load control, automatic reading of utility meters, and the like. The primary and secondary distribution network, however, is anything but homogeneous from the viewpoint of a carrier current signal, which is typically in the frequency range of 30 kHz to 300 kHz.

A major disadvantage in implementing a large scale distribution power line carrier communication system is the difficulty to predict or calculate signal levels at all points of the distribution network. This is largely due to the variations of signal propagation caused by variations in the geometry of conductor spacing, and unequal loading of the three-phase distribution lines by transformers, branches and taps.

The problems associated with distributing carrier currents within a large building were dealt with in U.S. Pat. No. 2,743,434 by applying the carrier current signal equally to all of the single phase conductors and the neutral conductor within a common conduit, to cause them to function as a single conductor within the conduit. While this arrangement may be suitable for communications within a building, applying the carrier current signal to all of the conductors of a polyphase primary distribution system provides little or no improvement in predicting signal levels at the various points of the distribution system, as the propagation mode is converted to a plurality of modes at the first line discontinuity.

SUMMARY OF THE INVENTION

Briefly, the present invention is a new and improved polyphase distribution network power line carrier communication system which facilitates the calculation of carrier signal levels at various points of the distribution system by eliminating or minimizing intermode conversion which occurs at line discontinuities. The modulated carrier current signal is applied to the phase conductors, or to the phase conductors and the neutral conductor, with coupling apparatus between the transmitter and conductors arranged to select a predetermined propagation mode, i.e., a predetermined voltage profile of the carrier signal voltages relative to earth ground. The selected propagation mode is re-established at selected points along the distribution system, such as at line discontinuities which may cause intermode conversion, by connecting impedance elements between the conductors at the line discontinuities, which elements are selected to re-establish the same proportional relationship between the signal voltages which existed at the signal coupling point. By selection and then establishing the propagation mode for the distribution network which will be attenuated the least, and by maintaining the selected propagation mode by re-establishing the mode with static impedance elements, the signal attenuation will be minimized and the signal levels on each of the conductors may be more easily calculated at points throughout the distribution system. Thus, the points where amplifying repeaters are required in order to maintain adequate signal to noise ratio, may be more accurately selected, and since the impedance elements re-establish the desired proportional relationship between the signal levels on the conductors, a particularly severe attenuation on one phase merely results in proportioning the attenuation among all of the carrier current signals. Thus, when a repeater is required, the communication signals on all conductors will require amplification. Otherwise, repeaters would be required for amplifying a signal on one conductor while the signal levels on the remaining conductors may not require amplification.

BRIEF DESCRIPTION OF THE DRAWING

The invention may be better understood, and further advantages and uses thereof more readily apparent, when considered in view of the following detailed description of exemplary embodiments, taken with the accompanying drawings, in which:

FIG. 1 is a schematic diagram of a three conductor primary distribution network and power line carrier communication system constructed according to an embodiment of the invention which utilizes an impedance matching and signal level transformer having isolated input and output windings in the signal coupler;

FIG. 2 is a schematic diagram which illustrates the teachings of the invention set forth in FIG. 1, except modified to operate with a four conductor primary distribution network;

FIG. 4 is a schematic diagram of a three conductor primary distribution network and power line carrier communication system constructed according to an embodiment of the invention wherein the propagation mode requires the voltage levels of the carrier signals to be substantially equal to one another at any selected point of the distribution system; and FIG. 5 is a schematic diagram of a four conductor primary distribution network and power line carrier communication system, with a propagation mode similar to that of FIG. 4, and with an autotransformer in the signal coupler, instead of a matching transformer of the isolated winding type.

DESCRIPTION OF PREFERRED EMBODIMENTS

Figure 3:
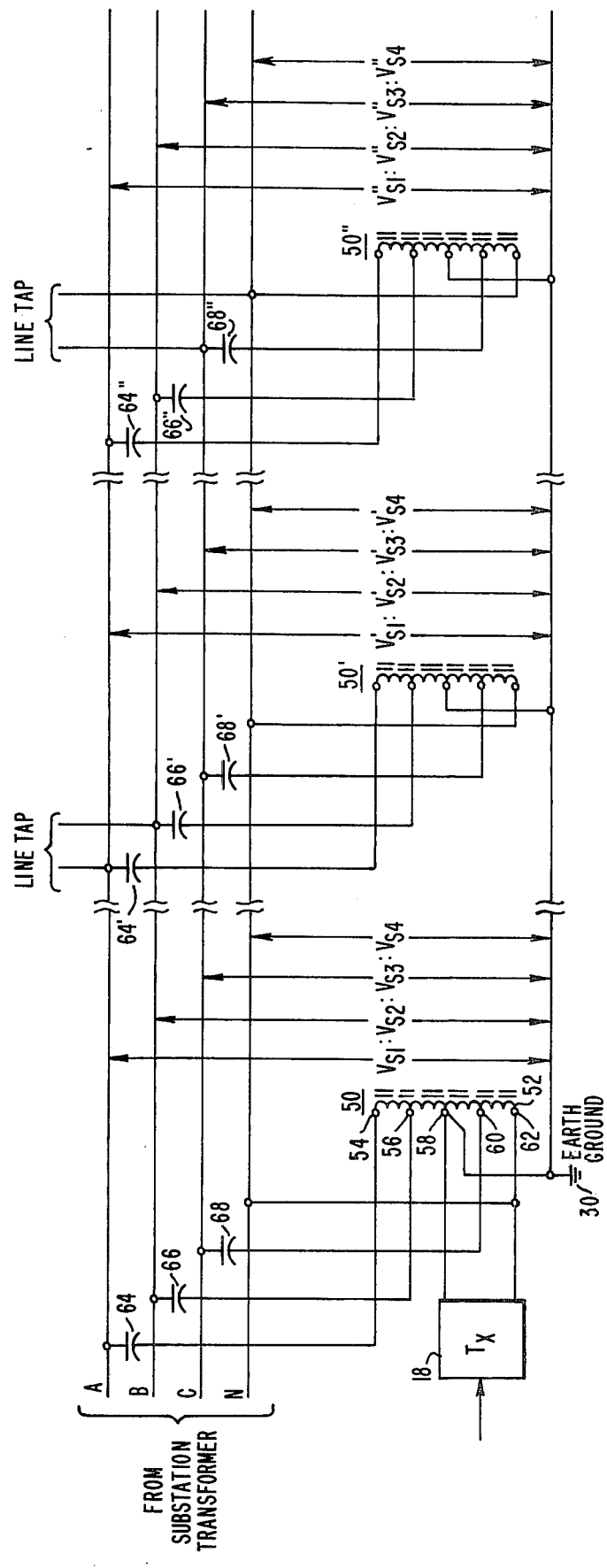
FIG. 3 is a schematic diagram of a four conductor primary distribution network and power line carrier communication system constructed according to an embodiment of the invention which utilizes an autotransformer in the signal coupler.

The transmission of power line carrier communication signals on the conductors of a polyphase primary distribution system is subject to the phenomena of multi-mode propagation. With a four conductor system, there are four distinct or pure modes of electromagnetic propagation at the selected frequency. Model signals on multiconductor lines are most simply defined as constant frequency signals which propagate without distortion. Calculation of the voltage profile for each mode may be made for a given geometry of phase and neutral conductor spacing, as disclosed by J. R. Carson and R. S. Hoyt in a paper entitled "Propagation of Periodic Currents Over a System of Parallel Wires," Bell Sys. Tech. J., Volume 6, July, 1927, pp. 495-545. The desired signal voltage profile may require a predetermined conductor to have a different signal voltage magnitude than the other conductors, it may require that each conductor have a different signal voltage magnitude, or it may require that the signal voltage magnitudes be equal in all of the conductors.

Any one of the pure propagation modes is characterized by the following attributes:

a. the carrier signal voltages in the A, B and C phase conductors, and in the neutral conductor N, ($V_A$, $V_B$, $V_C$ and $V_N$, respectively,) maintain a constant proportion with respect to each other as the signal propagates along the conductors, b. the carrier signal currents $I_A$, $I_B$, $I_C$ and $I_N$ maintain a constant proportion with respect to each other as they propagate along the conductors, c. for a given mode the phase shift per unit distance is the same for each of the conductor voltages and for each of the conductor currents, d. for a given mode of propagation the attenuation constant, in nepers per unit distance, is the same for each of the conductor voltages and each of the conductor currents, and e. for a given mode the ratio of each conductor voltage to each conductor current is constant, i.e., $Z_A = V_A/I_A$, $Z_B = V_B/I_B$, and $Z_C = V_C/I_C$. These are the mode impedances.

The different modes are distinguished by:

a. a different fixed proportion of the conductor voltages and currents. In other words, the voltage profile for mode 1, $V_{A1}{:}V_{B1}{:}V_{C1}{:}V_{N1}$ will differ from the voltage profile or proportion $V_{A2}{:}V_{B2}{:}V_{C2}{:}V_{N2}$ for mode 2, b. a different phase shift constant or velocity of propagation, c. a different attenuation constant, and d. a different set of mode impedances.

Since the modes possess different attenuations and phase shifts, a signal composed of several modes will change its voltage profile $V_A{:}V_B{:}V_C{:}V_N$ or current profile $I_A{:}I_B{:}I_C{:}I_N$, as it propagates. Only pure modes propagate without a change in profile or proportion.

The importance of mode analysis for distribution power line carrier is the fact that the propagation of the least lossy modes results in the longest range for a given transmitter power. Thus, it is advantageous to couple the signal to the line such that the most efficient mode of propagation is used. However, line discontinuities as well as variations in conductor spacing, produce the phenomena of intermode conversion and reflection.

The most serious of these phenomena is the intermode conversion in which a single mode of propagation is converted to several modes at a discontinuity. Thus, signal power which may initially be carried by the most efficient propagation mode is split among less efficient modes with the consequent greater attenuation.

The present invention is a new and improved distribution network power line carrier system in which a predetermined propagation mode is selected and the carrier signals are applied to the conductors of the distribution network in a manner which establishes the voltage profile of this mode. This mode is then re-established whenever necessary, such as at each line discontinuity, by static impedance elements which are selected and connected to the conductors to redistribute the signal levels to return to the originally established voltage profile, i.e., to obtain the same proportions between the signals which existed at the signal coupling point. The static impedance elements cause the signal current drain to be proportionately shared by the signal current in all of the conductors. This reduces the number of repeaters required, and it enables the signal strength to be more accurately calculated throughout the distribution system, which aids the correct placement of the repeaters.

Turning now to the drawings, and to FIG. 1 in particular, there is shown a three-phase distribution network power line communication system 10 constructed according to a first embodiment of the invention. A complete distribution network power line communication system is illustrated in copending application Ser. No. 546,069 filed Jan. 31, 1975, now U.S. Pat. No. 3,967,264 which is assigned to the same assignee as the present application. Thus, the present application illustrates only those parts of a complete distribution network power line carrier communication system which are necessary in order to understand the claimed invention. For a complete understanding of a distribution network power line communication system, the copending application may be referred to, and it is hereby incorporated into the present application by reference.

More specifically, the distribution network power line communication system 10 includes phase conductors A, B and C from a substation transformer which, in this embodiment, will be assumed to be a delta-delta transformer and thus the distribution system is a three conductor system. System 10 further includes a source 12 of interrogation signals. Source 12 includes interrogation and response control, such as a digital computer located at the main control location, such as the central business office of an electrical utility. The computer may be programmed, for example, to interrogate remote communication terminals associated with loads connected to the distribution power lines of the electrical utility, to obtain data relative to the readings of utility meters, such as electrical, gas and water meters, and/or it may request the performance of other functions such as controlling non-critical loads. Electrical loads, such as electrically operated hot water heaters, may be selectively turned off and enabled, in order to provide a more constant overall demand for electrical power. Load continuity checks, switching, and service disconnect functions may also be provided.

The interrogation signals which are prepared by source 12 are sent by any conventional means to a selected distribution substation. Each of the substations to be communicated with include a central communication terminal for receiving interrogation signals from, and for sending response signals to, the source 12 of interrogation signals located at the central or main control location.

A convenient medium for communicating between the source 12 at the main control location and the plurality of distribution substations is by telephone. The address of each distribution substation would be a telephone number, with source 12 gaining access to a selected substation by automatically dialing its number. In like manner, when a communication terminal at a substation has a response signal for source 12, it would gain access to the source 12 by automatically dialing the telephone number associated with the source. A telephone link is an economical and convenient method of communicating between source 12 and the plurality of substations, and for purposes of example, it will be assumed that this portion of the interrogation and response communication link is the telephone. However, it is to be understood that this specific link may be wireless, such as radio or microwave, or any other suitable form of communication.

Each distribution substation includes one or more step-down power transformers (not shown), which includes primary windings connected to the high voltage transmission lines, and secondary windings connected to the primary distribution network, which includes phase conductors A, B and C. The primary distribution network includes line taps and branches, capacitor banks, and other elements which appear as discontinuities to communication signals in the range of about 3 kHz to 300 kHz, and the voltage level is stepped down to the secondary voltage distribution level near connected loads by a plurality of distribution transformers (not shown). Electrical loads, such as residential customers, are connected to the secondaries of the distribution transformers. Each electrical load has an addressable remote communication terminal associated therewith, which is connected to a secondary of a distribution transformer.

A modem 14 receives the interrogation signal from source 12, and it establishes a telephone link with a modem 16 which is part of the central communication terminal located at the selected distribution substation.

The signal from modem 16 is modulated and amplified in a transmitter 18 and coupled to the power line conductors A, B and C of the primary distribution network via a bidirectional coupler 20 which includes 60 Hz blocking capacitors 22, 24 and 26 and an impedance matching transformer 28. The signal is coupled between each of the line or phase conductors and earth ground 30. The impedance matching transformer 28, in this embodiment, is of the isolated winding type having a primary winding 32 and a secondary winding 34. The signal from transmitter 18 is applied to the primary winding 32.

In addition to matching the output impedance of the transmitter 18 to the impedance of the primary distribution network, the transformer 28 also establishes the desired propagation mode by selecting taps on the secondary winding 34 which establish the desired relative voltage magnitudes between the carrier signal voltages of the conductors A, B and C. The specific voltage profile or proportional relationship between the signal voltages may be calculated for the conductor spacing and geometry of the specific distribution system. Thus, as illustrated in FIG. 1, the signal voltages have a predetermined proportional relationship $V_{S1}:V_{S2}:V_{S3}$ from phase conductors A, B and C to ground 30, respectively.

Secondary taps 36, 38 and 40 of secondary winding 34 are connected to phase conductors A, B and C via capacitors 22, 24 and 26, respectively, and one end, or a center tap of winding 34, is connected to earth ground 30.

Transformer 28 is constructed to have low losses at the specific carrier frequency, and may be a relatively small inexpensive transformer having a ferrite magnetic core. The coupling capacitors 22, 24 and 26 are selected to present a low impedance to the frequency of the carrier signal, and a relatively high impedance at the power frequency of 50 or 60 Hz. For example, if the carrier frequency is about 100 kHz, a suitable value for each coupling capacitor would be 0.05 $\mu$ fd. Such a capacitor would present an impedance of about 50 K ohms to 60 Hz, and an impedance of about 30 ohms to 100 kHz.

The selected mode is propagated along the conductors while maintaining the voltage and current profile of the mode until reaching a line discontinuity, such as a tap, branch, capacitor bank, transformer, or the like. Intermode conversion is presented, however, by utilizing a transformer similar to transformer 28, at each discontinuity, which is connected to the phase conductors by capacitors in the same manner as transformer 28. FIG. 1 illustrates two line taps and the static impedance elements which are connected to the phase conductors in order to re-establish the voltage profile of the selected mode at each tap. The impedance elements associated with each line discontinuity, i.e., the transformer and capacitors, are given the same reference numerals, except with prime marks, as the reference numerals of the transformer and capacitors of the coupler 20, to indicate that they are the same as used at the coupling point. The voltages are proportional to one another, as illustrated in FIG. 1, at each re-establishing point, and the voltage profiles at each point bear the same proportion to one another as at the coupling point. If the line discontinuity is associated with a carrier signal receiving point, the primary winding of the matching transformer may be connected to the receiver. If it is not associated with a receiving point, the primary winding would not be connected. Thus, in FIG. 1, primary winding 32' of transformer 28' is shown unconnected, while the primary winding 32" of transformer 28' is shown connected to a receiver 46.

The arrangement of FIG. 1 will cause no intermode conversion to take place. Some reflection will occur and some signal will continue to propagate further along the line, but both the reflected signal and the continuing signal will consist only of the selected mode. The effect of the reflected signal will merely change the impedance of the line as seen by the transmitter 18. Thus, the multiconductor line behaves as a single conductor line with an earth return, the signal strength at different points of the distribution system may be more readily calculated, and since the communication signals in the various conductors retain their initial proportions relative to one another, they will all be ready for amplification by a repeater at the same point in the distribution system.

Response signals sent by remote stations in response to the interrogation signal are picked off of the coupler 20, such as from the primary winding 32, and a receiver 48 directs the response signal back to the source 12 via the modems 16 and 14.

FIG. 2 is a schematic diagram of a distribution network power line carrier communication system 10' which is similar to that of FIG. 1, except the primary distribution network is a four wire system, including a neutral conductor N from the common point of a wye secondary of a substation transformer. The neutral conductor N is connected to that tap of the secondary winding 34, such as tap 44, which will set the carrier signal voltage level on the neutral to the level dictated by the selected propagation mode. It will be noted that the neutral is above earth ground, as far as the carrier frequency is concerned, but since the neutral is directly connected to earth ground at power frequency, a blocking capacitor between the neutral and tap 44 is not required. The static elements at each point where the selected propagation mode is re-established, duplicate the coupling arrangement, and therefore are not illustrated in FIG. 2.

FIG. 3 is a schematic diagram of a distribution network power line carrier communication system 49 which is similar to the system shown in FIGS. 1 and 2, except an autotransformer 50 is used for impedance matching and for establishing the signal voltage profile for the selected propagation mode. Autotransformer 50 includes a winding 52 having taps 54, 56, 58, 60 and 62. Transmitter 18 is connected to selected taps, such as taps 58 and 62, and tap 58, which may be a center tap, is connected to earth ground 30. The remaining taps are connected to the phase and neutral conductors according to the desired voltage profile or proportional relationship between the signal voltage magnitudes, with taps 54, 56 and 60 being connected to phase conductors A, B and C via capacitors 64, 66 and 68, respectively, and with tap 52 being directly connected to the neutral conductor N.

Identical transformers 50' and 50" are connected in a similar manner as the coupling transformer 50 to the phase and neutral conductors at each line discontinuity, as well as any other selected points, to re-establish the selected propagation mode. The voltages of the proportional relationship $V_{S1}'$; $V_{S2}'$; $V_{S3}':V_{S4}'$ and $V_{S1}":V_{S2}":V_{S3}": V_{S4}"$ at the two remote locations provide profiles which are similar to that profile established at the coupling point, indicated by $V_{S1}:V_{S2}:V_{S3}:V_{S4}$. For a three wire system, the autotransformer 50 would be connected to the phase conductors in a manner similar to that illustrated in the FIG. 1 embodiment. If a line discontinuity is associated with a carrier signal receiving point, the receiver may be connected to selected taps on the autotransformer.

If the selected propagation mode requires equal signal voltages on the conductors of the distribution system, the impedances connected to the phase and neutral conductors at the points remote from the coupling point may be simplified, as with this propagation mode a transformer is not required at the remote points. The equal voltage propagation mode is often found to have the least attenuation in typical distribution networks having phase conductors disposed in a common horizontal plane appreciably spaced from the neutral conductor when the neutral conductor is isolated from ground at the signal voltage frequencies. FIG. 4 is a schematic diagram of a three wire distribution network power line communication system 69 having phase conductors A, B and C. In this embodiment, the coupling means includes an impedance matching transformer 70 having a primary winding 72 connected to the transmitter 18, and a secondary winding 74 having taps 76 and 78. Tap 78 is connected to earth ground 30, and tap 76 is connected to the phase conductors A, B and C via capacitors 80, 82 and 84, which apply the carrier signal to the conductors with equal signal voltage magnitudes, while blocking the flow of power frequency current. At each line discontinuity, as well as other selected points, such as at unbalanced loads 92 and 94 shown in FIG. 4, impedance elements are connected between the phase conductors to equalize the signal voltages and re-establish the selected propagation mode. The impedance elements may simply be capacitors 86, 88 and 90, which may be similar to capacitors 80, 82 and 84. Capacitor 86 is connected between conductors A and B; capacitor 88 is connected between conductors B and C; and capacitor 90 is connected between conductors A and C. Capacitor 90 could be eliminated without substantially changing the signal voltage magnitudes between conductors A and C.

In like manner, capacitors 86', 88' and 90' are connected between the phase conductors at the unbalanced load point 94.

FIG. 5 is a schematic diagram of a distribution network power line carrier communication system 99, which is similar to the system 69 shown in FIG. 4 in utilizing a propagation mode with equal signal voltages on the conductors, with FIG. 5 additionally illustrating how the embodiment of FIG. 4 would be modified with a four wire primary distribution network, as well as illustrating that the matching transformer may be an autotransformer, and that the impedance elements at the remote propagation mode correcting point may be series circuits tuned to series resonance at the carrier frequency.

More specifically, a coupler includes an auto-transformer 100 having a winding 102 which includes taps 104, 106 and 108. The transmitter 18 is connected to selected taps, such as taps 104 and 108, and one of the taps, such as tap 108 is connected to earth ground 30. The tap of the transformer 100 which provides the desired voltage is connected to the phase conductors A, B and C via capacitors 110, 112 and 114, and the same tap is directly connected to the neutral conductor N.

At a first mode correction point remote from the coupling point, capacitors 116, 118 and 120 are interconnected between the phase conductors and the neutral conductor, forcing the signals to be equal to one another and in phase.

At another mode correction point remote from the coupling point, the carrier signals are again forced to be equal and in phase, using capacitive-inductive series circuits which are tuned to the carrier frequency. For example, a capacitor 122 and an inductor 124 are serially connected between conductors A and B, a capacitor 126 and an inductor 128 are serially connected between conductors B and C, and a capacitor 130 and an inductor 132 are serially connected between conductors C and N.

In summary, there has been disclosed a new and improved distribution network power line carrier communication system which establishes a selected propagation mode, and maintains the selected propagation mode throughout the system. Maintaining the selected mode not only reduces signal attenuation, but it causes the signal current drain to be proportionately shared by the signal currents in all of the conductors. The disclosed arrangement thus reduces the number of signal amplifying repeaters which are required, and it enables the placement of the repeaters to be more accurately determined since the signal levels of the communication signal are more readily calculated at the various points of the distribution system.

We claim as our invention:

1. A polyphase, power frequency, distribution network power line carrier communication system, comprising:

a plurality of distribution network power line conductors to which a carrier signal is to be coupled, means providing a carrier signal having a frequency substantially higher than power frequency, means coupling said carrier signal to each of said conductors to provide a predetermined proportional relationship between the carrier signals of said conductors, and impedance elements connected between said conductors remote from the signal coupling point, said impedance elements being devoid of connection to said means providing the carrier signal, other than through said distribution network power line conductors, said impedance elements being selected to present a high impedance to power frequency and substantially lower impedances to the frequency of the carrier signal, said impedance elements also being selected to re-establish said predetermined proportional relationship between the carrier signals of said conductors.

2. The distribution network power line carrier communication system of claim 1 wherein the predetermined proportional relationship is a carrier signal voltage profile in which at least one of carrier signal voltages has a magnitude which differs from the magnitudes of the other carrier signal voltages.

3. The distribution network power line carrier communication system of claim 1 wherein the predetermined proportional relationship is a carrier signal voltage profile in which the magnitudes of all of the carrier signal voltages are different.

4. The distribution network power line carrier communication system of claim 1 wherein the predetermined proportional relationship is a carrier signal voltage profile in which the magnitudes of all of the carrier signal voltages are substantially the same.

5. The distribution network power line carrier communication system of claim 1 wherein the plurality of distribution network power line conductors to which the carrier signal is coupled are the phase conductors.

6. The distribution network power line carrier communication system of claim 1 wherein the plurality of conductors to which the carrier signal is coupled are the phase and neutral conductors.

7. The distribution network power line carrier communication system of claim 1 wherein the means providing the carrier signal includes transmitter means, and the means coupling the carrier signal to the conductors includes a transformer having a primary winding connected to said transmitter means, and a secondary winding connected to the conductors.

8. The distribution network power line carrier communication system of claim 7 wherein the secondary winding has taps thereon, and including a plurality of capacitors, with certain of the taps being connected to predetermined conductors via said capacitors.

9. The distribution network power line carrier communication system of claim 7 wherein the secondary winding has taps thereon, and including a plurality of capacitors, with at least one of the taps being connected to different conductors via different capacitors.

10. The distribution network power line carrier communication system of claim 7 including a plurality of capacitors, and wherein each conductor is connected to a common point on the secondary winding of the transformer via a different one of said plurality of capacitors.

11. The distribution network power line carrier communication system of claim 1 wherein the means providing the carrier signal includes transmitter means, and the means coupling the carrier signal to the conductors includes an autotransformer connected to said transmitter means and to the conductors.

12. The distribution network power line carrier communication system of claim 11 including a plurality of capacitors, and wherein each conductor is connected to a common point on the autotransformer via a different one of said plurality of capacitors.

13. The distribution network power line carrier communication system of claim 11 wherein the autotransformer has taps thereon, and including a plurality of capacitors, with certain of the taps being connected to predetermined conductors via said capacitors.

14. The distribution network power line carrier communication system of claim 11 wherein the autotransformer has taps thereon, and including a plurality of capacitors, with at least one of the taps being connected to different conductors via different capacitors.

15. The distribution network power line carrier communication system of claim 1 wherein the means coupling the carrier signal to the conductors includes a first transformer having taps, and a first plurality of capacitors connected from predetermined taps to the conductors, and wherein the impedance elements connected to the conductors include a second transformer, similar to the first, and a second plurality of capacitors similar to the first plurality, connected from predetermined taps of the second transformer to the conductors in a manner similar to the connection of the first plurality of capacitors to the conductors.

16. The distribution network power line carrier communication system of claim 1 wherein the means coupling the carrier signal to the conductors includes a transformer and a plurality of capacitors which couples the carrier signal substantially equally to each of the conductors, and the impedance elements are selected to force the carrier signals to be substantially equal to one another.

17. The distribution network power line carrier communication system of claim 16 wherein the impedance elements are capacitors.

18. The distribution network power line carrier communication system of claim 16 wherein the impedance elements are series capacitance-inductance circuits tuned to resonance at the frequency of the carrier signal.

* * * * *